(12) United States Patent
Vangala et al.

(10) Patent No.: US 12,231,913 B2
(45) Date of Patent: Feb. 18, 2025

(54) SYSTEMS AND METHODS FOR IAB MEC

(71) Applicant: APPLE INC., Cupertino, CA (US)

(72) Inventors: Sarma V. Vangala, Cupertino, CA (US); Sudeep Manithara Vamanan, Munich (DE); Fangli Xu, Beijing (CN); Haijing Hu, Cupertino, CA (US); Krisztian Kiss, Cupertino, CA (US); Mona Agnel, Greater London (GB); Naveen Kumar R Palle Venkata, San Diego, CA (US); Ralf Rossbach, Neubiberg (DE); Sethuraman Gurumoorthy, Cupertino, CA (US); Yuqin Chen, Beijing (CN); Zhibin Wu, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 11 days.

(21) Appl. No.: 17/593,291

(22) PCT Filed: Jun. 28, 2021

(86) PCT No.: PCT/CN2021/102762
§ 371 (c)(1),
(2) Date: Sep. 15, 2021

(87) PCT Pub. No.: WO2023/272436
PCT Pub. Date: Jan. 5, 2023

(65) Prior Publication Data
US 2024/0049000 A1    Feb. 8, 2024

(51) Int. Cl.
*H04W 16/28*    (2009.01)
*H04W 80/06*    (2009.01)
*H04W 88/08*    (2009.01)

(52) U.S. Cl.
CPC ............ *H04W 16/28* (2013.01); *H04W 80/06* (2013.01); *H04W 88/085* (2013.01)

(58) Field of Classification Search
CPC ... H04W 16/28; H04W 80/06; H04W 88/085; H04W 24/02
See application file for complete search history.

(56) References Cited

U.S. PATENT DOCUMENTS

2020/0120446 A1    4/2020    Stammers et al.
2020/0162348 A1*   5/2020    Suthar ................. H04L 41/0894
(Continued)

FOREIGN PATENT DOCUMENTS

CN    111225348 A    6/2020
WO    2020000203 A1  1/2020

OTHER PUBLICATIONS

PCT/CN2021/102762, International Search Report and Written Opinion, Mar. 9, 2022, 9 pages.

*Primary Examiner* — Justin T Van Roie
(74) *Attorney, Agent, or Firm* — Dorsey & Whitney LLP

(57) ABSTRACT

Systems and methods for using integrated access and backhaul (IAB) nodes configured to provide multi-access edge computing (MEC) functionality are disclosed herein. An TAB node includes a distributed unit (DU) having a local application instance of a MEC-enabled application. The local application instance is configured for communication with a first user equipment (UE) connected to the TAB node. A mobile termination functionality (MT) of the IAB node uses a packet data convergence protocol (PDCP) layer to transport data of the local application instance between the MT and an IAB donor. Further, data of the local application instance is transported between the UE and the TAB node via one of a variety of methods, including the use of a second PDCP layer at the DU (and optionally the use of service data adaptation protocol (SDAP) layers at each of the DU and the MT), and/or via sidelink.

20 Claims, 10 Drawing Sheets

(56) References Cited

U.S. PATENT DOCUMENTS

| | | | |
|---|---|---|---|
| 2020/0296609 A1* | 9/2020 | Rayavarapu | H04W 12/06 |
| 2021/0099976 A1* | 4/2021 | Mueck | H04W 72/04 |
| 2021/0144063 A1* | 5/2021 | Abboud | H04W 28/084 |
| 2021/0258244 A1* | 8/2021 | Xu | H04L 45/28 |
| 2021/0400568 A1* | 12/2021 | Chaysinh | H04W 36/13 |
| 2021/0400675 A1* | 12/2021 | Lee | H04W 72/53 |
| 2022/0124543 A1* | 4/2022 | Orhan | G06N 3/006 |
| 2022/0353801 A1* | 11/2022 | Misra | H04W 24/10 |
| 2023/0269630 A1* | 8/2023 | Teyeb | H04W 76/20 370/331 |
| 2024/0022469 A1* | 1/2024 | Hu | H04L 41/122 |

* cited by examiner

SYSTEMS AND METHODS FOR IAB MEC

TECHNICAL FIELD

This application relates generally to wireless communication systems, including systems and methods for using integrated access and backhaul (IAB) nodes configured to provide multi-access edge computing (MEC) functionality at the IAB node.

BACKGROUND

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi®).

As contemplated by the 3GPP, different wireless communication systems standards and protocols can use various radio access networks (RANs) for communicating between a base station of the RAN (which may also sometimes be referred to generally as a RAN node, a network node, or simply a node) and a wireless communication device known as a user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a or g Node B or gNB).

A RAN provides its communication services with external entities through its connection to a core network (CN). For example, E-UTRAN may utilize an Evolved Packet Core (EPC), while NG-RAN may utilize a 5G Core Network (5GC).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

A millimeter wave (mmWave) deployment of a wireless network may use fiber backhaul in order to carry traffic at NR speeds. It may be difficult or expensive, however, to provide fiber backhaul for the many nodes used for mmWave coverage. In certain systems, integrated access and backhaul (IAB) may be used to overcome deployment costs of ultradense NR mmWave networks by realizing wireless backhaul links to relay the access traffic.

IAB architectures enable multi-hop routing wherein each of a hierarchy of IAB nodes serve as both access nodes to UEs and provide wireless backhaul links to other IAB nodes and/or an IAB donor that is connected to a CN. On the wireless backhauls, a backhaul adaptation protocol (BAP) layer may enable routing over multiple hops through the system. The BAP allows for the IAB nodes and/or the IAB donor to communicate with each other and provides for a number of functionalities which include, for example, mapping of next hop radio link control (RLC) channels, routing to next hop IAB nodes/the IAB donor based on traffic differentiation, indication of network events (e.g., radio link failure (RLF)), data transfer, and/or flow control feedback signaling, etc.

Figure 1:
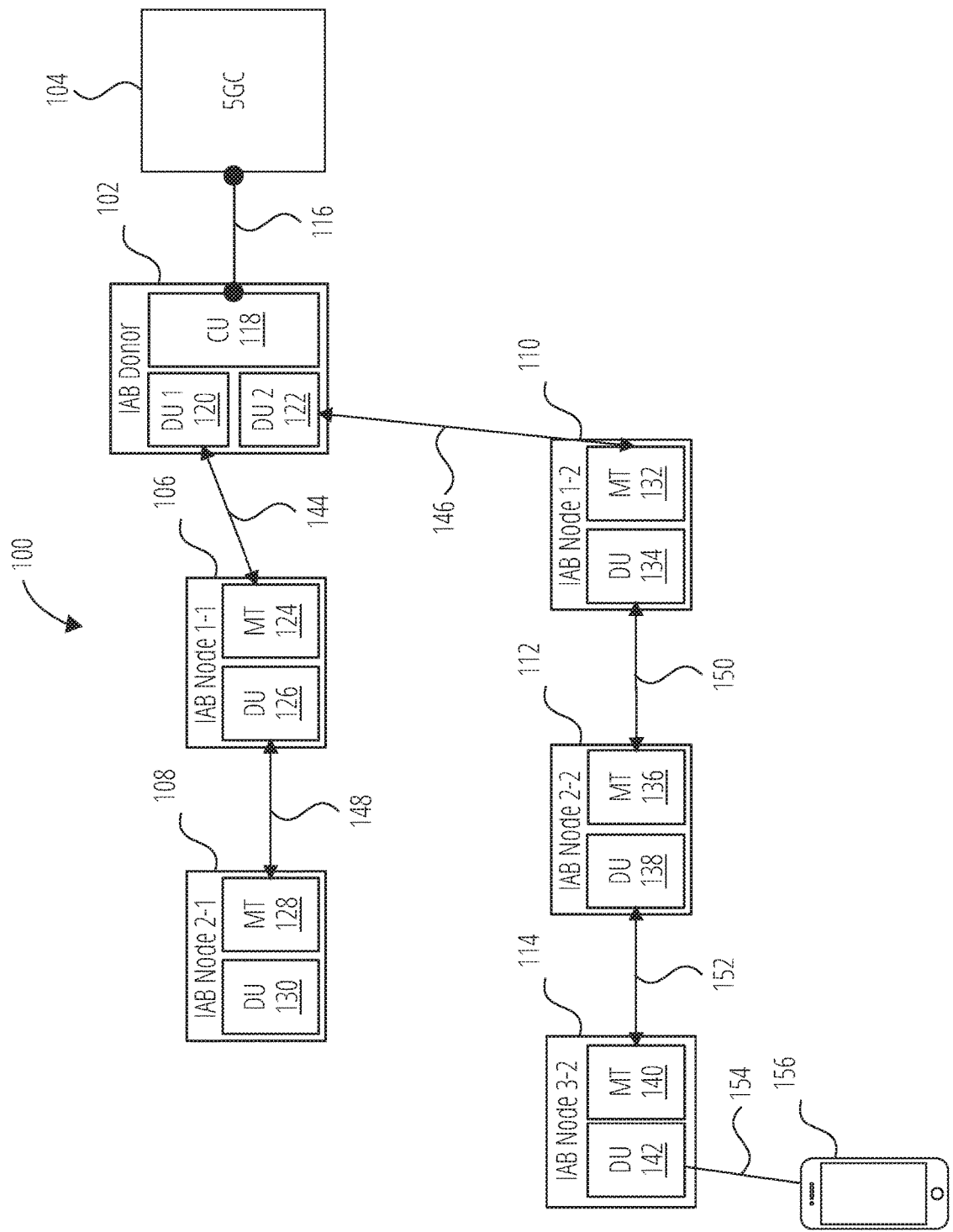
FIG. 1 illustrates an IAB network according to an embodiment.

FIG. 1 illustrates an IAB network 100 according to an embodiment. The IAB network 100 includes an IAB donor 102 that is communicatively connected with a 5GC 104 via a fiber backhaul 116. This connection may comprise an NG interface.

The IAB donor 102 includes a control unit (CU) 118 one or more distributed units (DU) (e.g., the DU 1 120, and the DU 2 122).

The IAB network 100 further includes an IAB node 106 (shown as IAB Node 1-1), an IAB node 108 (shown as IAB Node 2-1), an IAB node 110 (shown as IAB Node 1-2), an IAB node 112 (shown as IAB Node 2-2), and an IAB node 114 (shown as IAB Node 2-3). An IAB node may include a mobile termination functionality (MT) and a DU. As illustrated in FIG. 1, the IAB node 106 includes the MT 124 and the DU 126, the IAB node 108 includes the MT 128 and the DU 130, the IAB node 110 includes the MT 132 and the DU 134, the IAB node 112 includes the MT 136 and the DU 138, and the IAB node 114 includes the MT 140 and the DU 142.

Within the IAB network 100, the IAB nodes 106 through 114 and the IAB donor 102 may connect to other(s) of the IAB nodes 106 through 114 and/or the IAB donor 102, via one or more wireless backhauls between a DU and an MT. For example, the IAB donor 102 and the IAB node 106 are connected via a first wireless backhaul 144 between the DU 1 120 of the IAB donor 102 and the MT 124 of the IAB node 106, and the IAB donor 102 and the IAB node 110 are connected via a second wireless backhaul 146 between the DU 2 122 of the IAB donor 102 and the MT 132 of the IAB node 110. The IAB node 106 and the IAB node 108 are connected via a third wireless backhaul 148 between the DU 126 of the IAB node 106 and the MT 128 of the IAB node 108. The IAB node 110 and the IAB node 112 are connected via a fourth wireless backhaul 150 between the DU 134 of the IAB node 110 and the MT 136 of the IAB node 112. The IAB node 112 and the IAB node 114 are connected via a fifth wireless backhaul 152 between the DU 138 of the IAB node 112 and the MT 140 of the IAB node 114.

Finally, the IAB network 100 includes the UE 156, which is connected to the DU 142 of the IAB node 114. The DU 142 may provide the access link 154 to make this connection. Accordingly, the UE 156 is functional with the 5GC 104 via a communication relay through the IAB node 114, the IAB node 112, the IAB node 110, and the IAB donor 102. Skilled persons will recognize from the disclosure herein that any of the IAB nodes 106 through 114 and/or the IAB donor 102 may also provide access to one or more other UEs via an access link with a respective DU.

The CU 118 of the IAB donor 102 may provide for basic control plane functionality throughout the IAB network 100. In certain embodiments, the CU 118 of the IAB donor 102 includes CU-control plane (CU-CP), CU-user plane (CU-UP), and/or other functionality.

A DU (e.g., DU 1 120, the DU 2 122, the DU 126, the DU 130, the DU 134, the DU 138, and/or the DU 142) may be configured to communicate with other entities within the IAB network 100 (e.g., with a child IAB node via a wireless backhaul, and/or with one or more UE over an access link, in the manner described.

An MT of an IAB node (e.g., the MT 124 of the IAB node 106, the MT 128 of the IAB node 108, the MT 132 of the IAB node 110, the MT 136 of the IAB node 112, and/or the MT 140 of the IAB node 114) comprises components that configure an IAB node to behave similar to a regular UE. For example, protocols that typical UEs use to connect to a RAN are supported in the MT with additional enhancements discussed in 3GPP Rel. 16 and Rel. 17. For example, an MT in an IAB node allows the IAB node to establish signaling radio bearers (SRBs) and/or data radio bearers (DRBs) with its parent node. An MT may further perform cell selection to identify which parent entity to join and sets up and utilizes one or more protocol layers (e.g., including a BAP layer) that provide functionality for routing data for different UE bearers over different routes through the network.

IAB nodes 106 through 114 may each act as a "parent" and/or a "child" to one or more other of the IAB nodes 106 through 114 to which it is connected. An IAB node that is closer on a route (in number of hops over wireless backhauls) to the IAB donor 102 than another IAB node to which it is connected may be considered a "parent" node of the other IAB node. For example, in FIG. 1, the IAB node 106 is a parent node of the IAB node 108. An IAB node that is further on a route (in number of hops over wireless backhauls) from the IAB donor 102 than another IAB node to which it is connected may be considered a "child" node of that the other IAB node. For example, the IAB node 112 is a child node of the IAB node 110. In similar fashion, the IAB donor 102 may be understood to be the parent node of the IAB node 106 and the IAB node 110 (which are each child nodes of the IAB donor 102).

The use of the IAB donor 102 and one or more of the IAB nodes 106 through 114 may promote better overall coverage for UE in the geographical area covered by the IAB network 100 as opposed to using a single transmission reception point in a geographical area. For example, in a developed area, the use of the IAB nodes 106 through 114 may promote line of sight (LoS) coverage around corners. Further, the location of the IAB nodes 106 through 114 away from the IAB donor 102 may increase the coverage range for the IAB network 100 generally.

Figure 2:
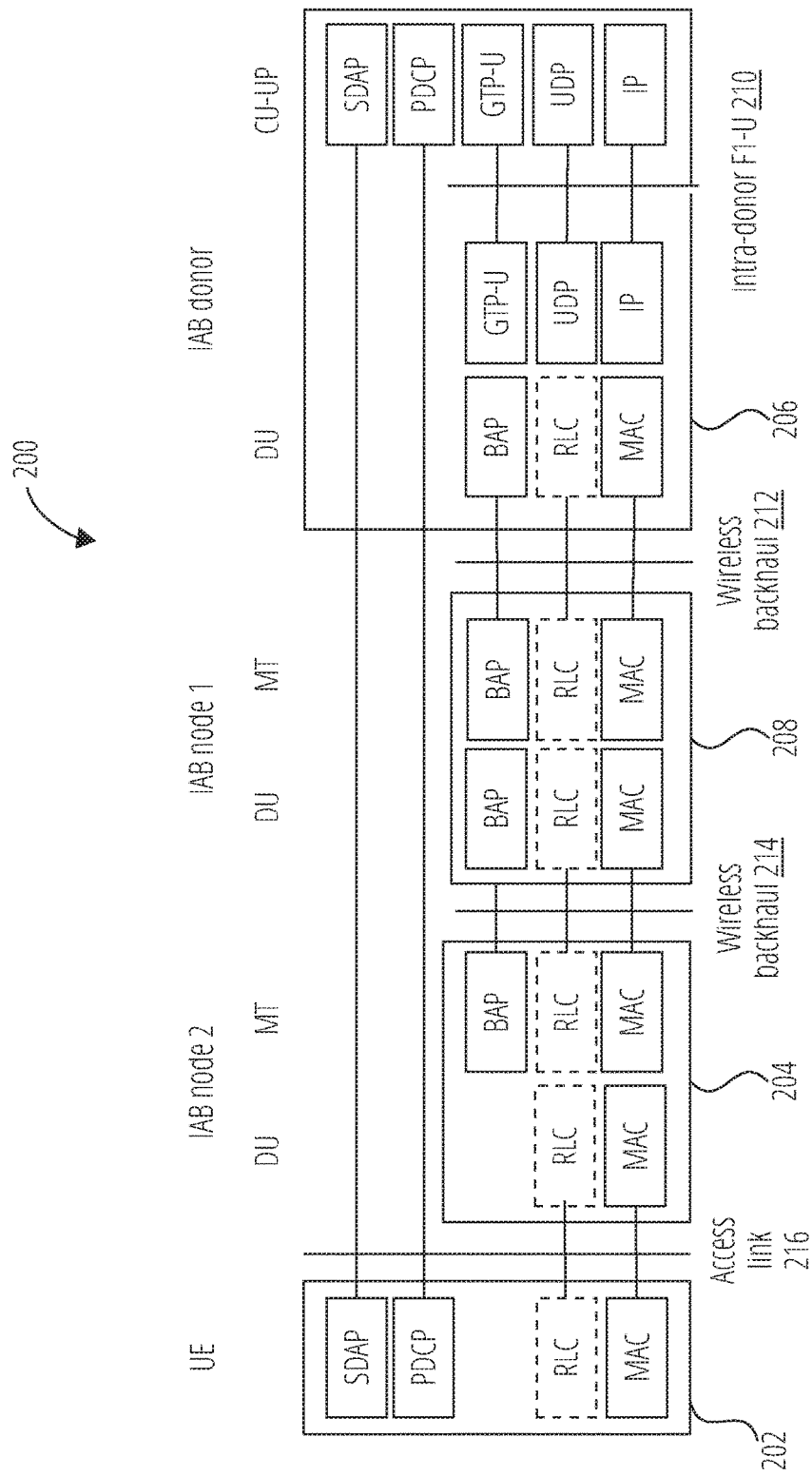
FIG. 2 illustrates a user plane protocol architecture for IAB according to an embodiment.

FIG. 2 illustrates a user plane protocol architecture for IAB 200 according to an embodiment. The user plane protocol architecture for IAB 200 shows various protocol layers for a UE 202, a first IAB node 208 (IAB node 1), a second IAB node 204 (IAB node 2), and an IAB donor 206. The various layers may correspond to MT, DU, or CU-UP entities, as illustrated. The DU and CU-UP of the IAB donor 206 may communicate through an intra-donor F1-U interface 210. In this example, the UE 202 wirelessly communicates with the second IAB node 204 through a dedicated DRB on an access link 216, the second IAB node 204 wirelessly relays the uplink traffic to the first IAB node 208 via a first wireless backhaul 214, and the first IAB node 208 wirelessly relays the uplink traffic to the IAB donor 206 via a second wireless backhaul 212. The protocol layers include, for example, medium access control (MAC), RLC, packet data convergence protocol (PDCP), service data adaptation protocol (SDAP), internet protocol (IP), user datagram protocol (UDP), and general packet radio service (GPRS) tunneling protocol user plane (GTP-U).

The user plane protocol architecture for IAB 200 also includes a BAP layer that provides functionality for routing data for different UE bearers over different routes through the network. This may be done by having an adaptation layer header that includes some information to identify a bearer. The routing includes mapping incoming data to an outgoing link based on the bearer identifier.

Figure 3:
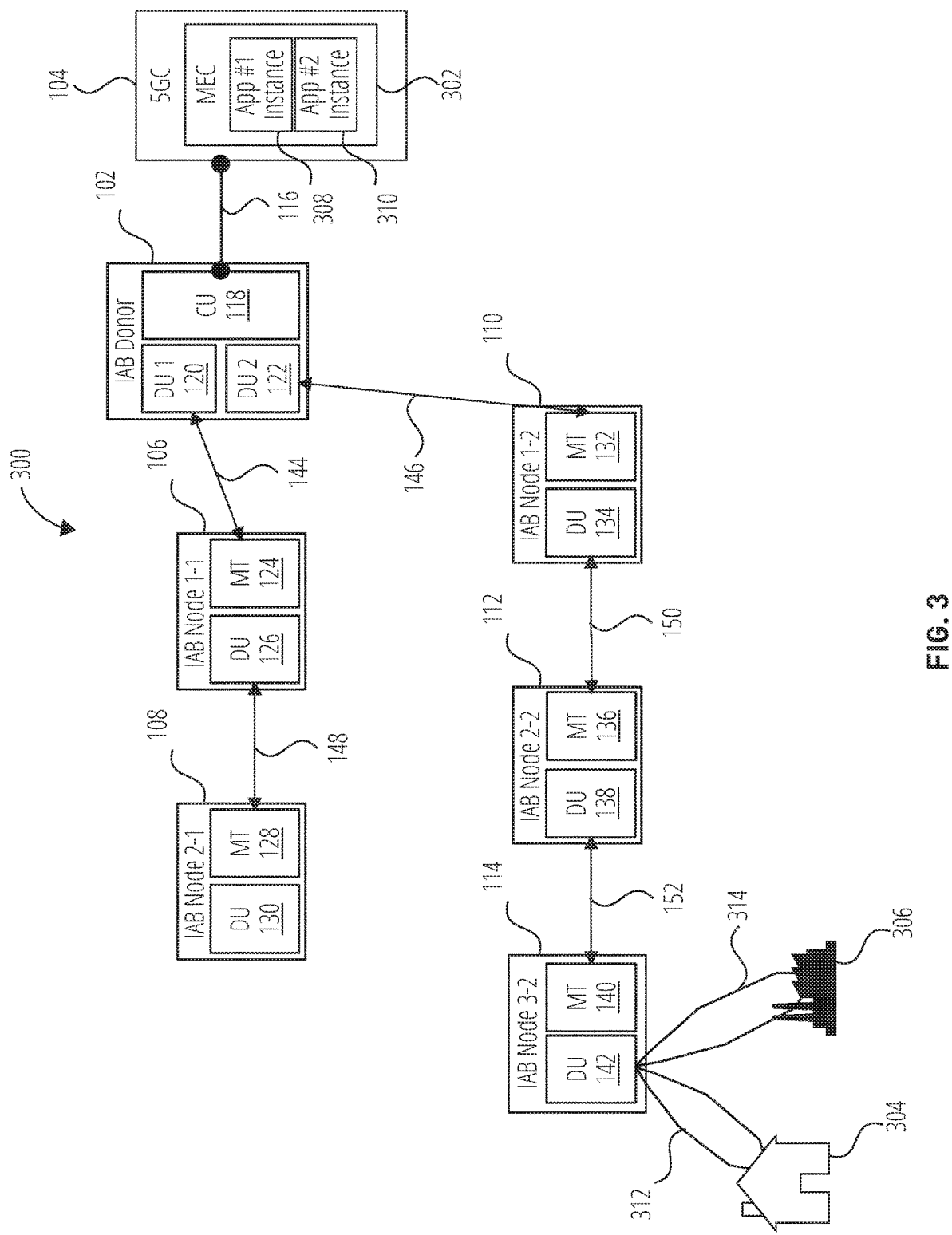
FIG. 3 illustrates an IAB network according to an embodiment.

FIG. 3 illustrates an IAB network 300 according to an embodiment. The IAB network 300 may include the IAB donor 102, the 5GC 104, the IAB node 106, the IAB node 108, the IAB node 110, the IAB node 112, and the IAB node 114 of FIG. 1 (along with their component parts and connections to each other, in the manner described in FIG. 1).

In the embodiment of FIG. 3, the 5GC 104 may include a multi-access edge computing (MEC) functionality 302. The MEC functionality 302 may provide one or more instances of one or more network-communication-dependent application(s) (e.g., the application #1 instance 308 and the application #2 instance 310, though fewer or more than these may be provided in alternative embodiments) used by UE(s) of the IAB network 300). Each of the application #1 instance 308 and the application #2 instance 310 may each communicate with UE of the IAB network 300 via a user plane function (UPF) of the 5GC 104. According to the MEC functionality 302, once established, the each of the application #1 instance 308 and/or the application #2 instance 310 may be updated by and/or send updates to other, external instances of that application (e.g., out through the 5GC 104 and over the internet), to keep the various instances of the application consistent on a scale beyond the IAB network 100. Then, due to the proximity of the application #1 instance 308/application #2 instance 310 (within the MEC functionality 302 of the 5GC 104), the respective application(s) may operate with a UE of the IAB network 300 more quickly than a case where the instance of the application with which the UE communicates is instead available only beyond the 5GC 104 (e.g., via the internet). This speedup may be due to a reduced latency from information not traveling as "far" (e.g., through the relevant hops of the IAB network 300 back to the 5GC 104).

Further, the IAB network 300 includes a first non-public network (NPN)/stand-alone non-public network (SNPN) 304 and a second NPN/SNPN 306. Each of these may include one or more UE (not illustrated) that are configured for private communications according to the configuration of the respective NPN/SNPN. The UE of the first NPN/SNPN 304 are connected to the DU 142 of the IAB node 114 via the first plurality of access links 312, and the UE of the second NPN/SNPN 306 are connected to the DU 142 of the IAB node 114 via the second plurality of access links 314.

The use of NPN/SNPN may allow for better management of networks and the ability to build private networks using additional features like network slicing. For example, it may be that the application #1 instance 308 is configured to serve UE of the first NPN/SNPN 304 on a first network slice, and that the application #2 instance 310 is configured to serve UE of the second NPN/SNPN 306 on a second network slice.

In some instances, the network slicing according to application and NPN/SNPN may be intended to enable transmissions for the respective application through the IAB network 300 to meet certain quality of service (QoS) requirements. For example, it may be that an application is configured to use ultra-reliable low-latency communications (URLLC) with its UEs, meaning that, for example, that data of the application is delivered between a UE of the respective NPN/SNPN and a 5GC within a certain amount of time and/or with a certain reliability.

It may be, however, that these QoS requirements for the application(s) cannot be guaranteed in the IAB network 300 (even when the related application #1 instance 308 and/or the application #2 instance 310 are located in the 5GC 104 according to the MEC functionality 302). This may be because of the IAB nature of the IAB network 300. For example, the number of hops from the IAB node 114 back to the IAB donor 102 and to the 5GC 104 (which includes the application #1 instance 308 and the application #2 instance 310) may introduce latency to the extent that the QoS requirements for the application data are not met. Further note that in at least some networks, there is no upper limit on the number IAB nodes/number of hops that can exist in the network, meaning that this latency due to hopping can theoretically be relatively high for UE connected to the 5GC 104 via a route that uses many IAB nodes. Further, in some IAB architectures, an IAB node may be free to select to a different parent IAB node (e.g., the IAB node 114 that provides access to the UE of the first NPN/SNPN 304 and/or the second NPN/SNPN 306 may reselect to be the child of the IAB node 108 instead of the child of the IAB node 112) according to network conditions. In such cases, the speed possible on the new route to the 5GC (e.g., through the IAB node 108, IAB node 106, and IAB donor 102) may not guarantee the achievement of the QoS requirements for the application. Finally, each hop through the network represents a possible point of failure for information transfer, such that routes with a greater amount of hops through various IAB nodes may have a lower overall reliability.

Figure 4:
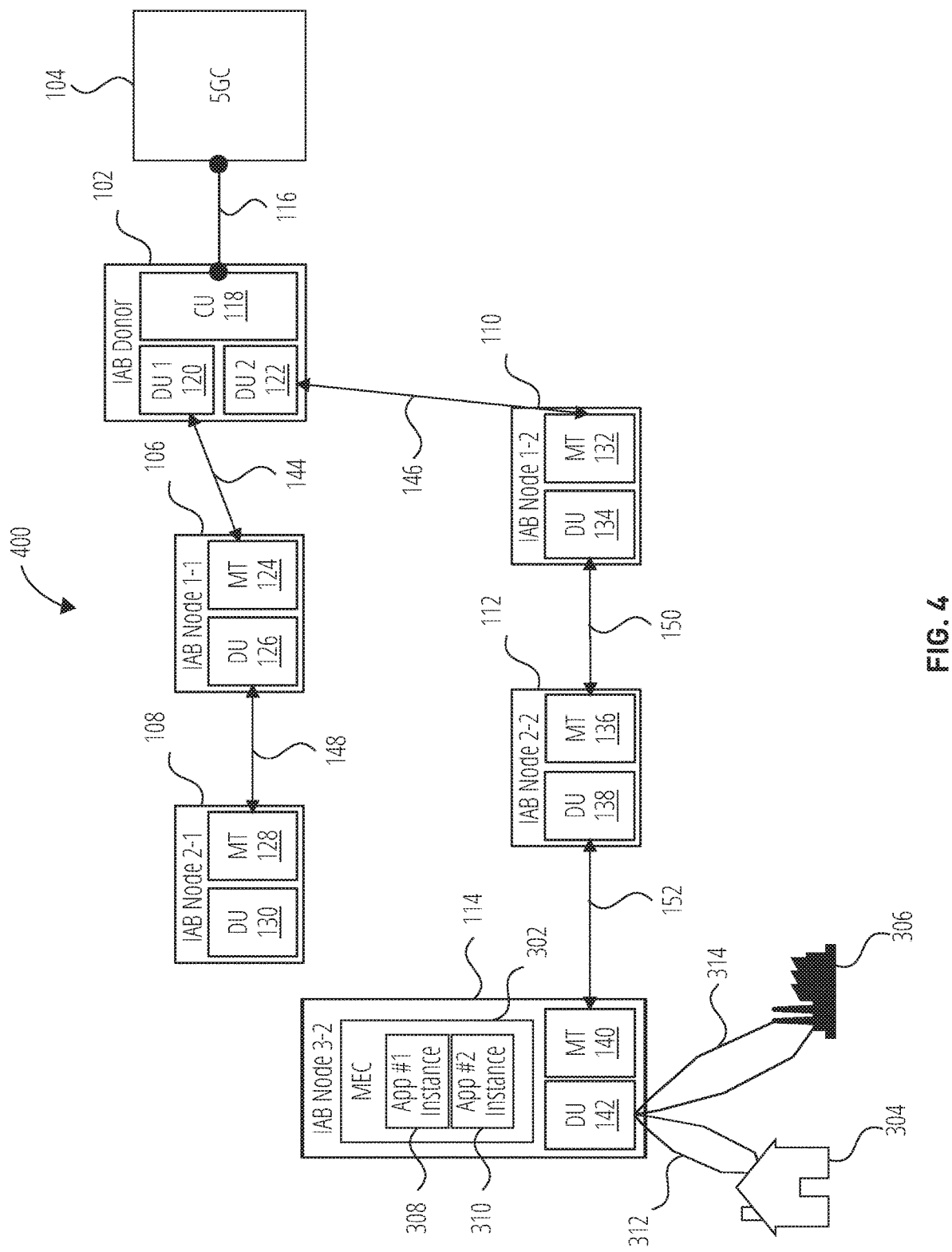
FIG. 4 illustrates an IAB network according to an embodiment.

FIG. 4 illustrates an IAB network 400 according to an embodiment. The IAB network 400 may include the IAB donor 102, the 5GC 104, the IAB node 106, the IAB node 108, the IAB node 110, the IAB node 112, and the IAB node 114 of FIG. 1 (along with their component parts and connections to each other, in the manner described in FIG. 1). Further, the IAB network 400 may also include the first NPN/SNPN 304 having the UE connected to the DU 142 of the IAB node 114 via the first plurality of access links 312, and the second NPN/SNPN 306 having the UE that are connected to the DU 142 of the IAB node 114 via the second plurality of access links 314, as described in relation to FIG. 3.

In FIG. 4, the MEC functionality 302 has been located in the IAB node 114 (instead of the 5GC 104 as in FIG. 3). The MEC functionality 302 includes the application #1 instance 308 and the application #2 instance 310, as these are also described in relation to FIG. 3. An IAB node that is capable of functioning as a MEC edge node may be described herein as an IAB MEC.

The location of the MEC functionality 302 within the IAB node 114 (e.g., the use of an IAB MEC) allows for relatively lower latency and higher reliability communications between the UE of the first NPN/SNPN 304 and/or second NPN/SNPN 306 and the corresponding application #1 instance 308 and/or application #2 instance 310 (due to no need to traverse back to the 5GC 104 via the hops between the IAB node 114 and the IAB node 112, the IAB node 112 and the IAB node 110, and the IAB node 110 and the IAB donor 102). Further, by using an IAB MEC having the application #1 instance 308 and the application #2 instance 310, the application may continue to function with the UE of the first NPN/SNPN 304 and the second NPN/SNPN 306, even in the case that the route from the IAB node 114 back to the 5GC 104 is congested or non-functional. The use of an IAB MEC may also allow for more finely-tuned device (UE) and network (corresponding NPN/SNPN) management, while still ensuring that accounting and other centralized management abilities from an operator perspective are maintained. Finally, IAB MECs may enable new business models. For example, 3rd party IAB MECs may be developed that are customized for use with certain applications (e.g., that are configured to provide certain application instances).

It is also contemplated that locating the MEC functionality 302 at the IAB node 114 may also be beneficial in the case of an application for a UE connected to the IAB node 114 and that corresponds to either of, e.g., the application #1 instance 308 or the application #2 instance 310, but that is not (necessarily) used on a corresponding NPN/SNPN. In other words, the use of the first NPN/SNPN 304 and the second NPN/SNPN 306 in the embodiment shown in FIG. 4 is given by way of example—it is contemplated that benefits of locating MEC functionality on an IAB node as described herein do not inherently require an NPN/SNPN to be so established.

Various potential use cases for IAB MECs are contemplated. For example, IAB MECs may be used to host application instances of applications for using augmented reality (AR), virtual reality (VR), and/or vehicle-to-everything (V2X) communications, industrial internet of things (HOT) applications, or any other case that may benefit from the ability to meet relatively strict QoS requirements (e.g., low latency and/or high reliability) in the context of an IAB network.

It is contemplated that in some cases, multiple IAB MECs may be used in a repeater configuration. It is contemplated that in some cases, multiple IAB MECs may be used to form a local network that includes the IAB MECs. For each of these options, at least two modes of operation are contemplated. In a first mode, each IAB MEC may be in a sidelink relay mode. In a second mode, each IAB MEC is centrally controlled by a macro node depending on needed capacity.

In order to practically and commercially achieve IAB MECs, various considerations may need to be taken into account. A first of category these considerations relates to 3GPP core functions. Firstly, it may be that consideration should be given to the enablement of third party devices which are not privy to original equipment manufacturer (OEM) integration procedures into operator networks. Accordingly, frameworks for integrating a third party IAB MEC into an existing carrier network may be beneficial.

Secondly, an IAB MEC would need to implement content caching techniques that go through the CU and retrieve appropriate content as needed (e.g., for updating application instances at the IAB MEC). Since IAB nodes may not provide for direct contact between an IAB node and the 5GC, a CU of an IAB donor may have to enable this operation. Accordingly, existing mechanisms for IAB networks may accordingly be updated within the RAN and CN domains to account for this.

Thirdly, in some cases, a UPF may need to be moved to the IAB MEC. Accordingly, mechanisms for distributed UPF architectures may be beneficial.

Fourthly, security with third party relays may be a concern, particularly in split PDCP architectures to be discussed. Relatedly, a framework of solutions to inter-operability issues (in the case of differing vendors for an IAB MEC and a UE) may be developed.

A second category of these considerations relates to 3GPP usage. Cases are anticipated where, due to backhaul failures on IAB MEC and/or backhaul or some other failure on a parent node to the IAB MEC) some services of an application will work while others are offline (e.g., services of the application that use access to the internet through the failed route may be offline). For example, in the case of a failure on a backhaul and/or node between the IAB MEC and the CU on the corresponding IAB donor, the local content for the application available in the application instances at the IAB MEC can still be provided to the UE. However, services of the application needing real time connectivity to the internet might not work. This combination may provide the user with a confusing user experience if this situation is not gracefully handled. Accordingly, applications may be implemented such the experience is uniform throughout these instances (or such that appropriate actions are taken to ensure that the user understands the reasons for the difference in experience).

A third category of these considerations relates to 3GPP RAN. Firstly, in some IAB nodes, there may be no PDCP layer capable of connecting the IAB node with MEC functionality present on the 5GC. For example, in some cases, an IAB node terminates at the RLC layer, while the MEC functionality (which may be currently within the 3GPP core) communicates using IP layer. Further, locating a MEC at the CU of the IAB donor instead (which can communicate through IP) may defeat the purpose of localized MEC since the UE needing service might still be multiple hops from the IAB donor (thus still being bound by QoS issues stemming from the need to hop).

Secondly, in some cases (e.g., commercial deployments), an IAB node and a CU of an IAB donor communicate using the F1 interface. It may be that related F1AP standards are vendor driven and up to implementation of a network operator and/or network node vendors. Accordingly, there may be no easy way to create a F1 interface between a CU of an IAB donor and a 3rd party IAB node. Accordingly, in the case of an IAB MEC, alternates to F1-C interfaces may need to be considered to ensure proper control of an IAB MEC by the CU of the IAB donor.

Systems and methods described herein may describe mechanisms that can be used to integrate IAB MECs (including 3rd party IAB MECs) into operator networks in a way that is secure and provides seamless service on-boarding. These may account for architectural impacts on such systems, describe CN functionalities that may be available through an IAB donor for accessing and managing IAB MEC functionalities, modifications needed to protocol stacks in IAB MECs and/or other nodes, and/or modifications to scheduling and grant request procedures performed on IAB MECs, among other possibilities.

Figure 5:
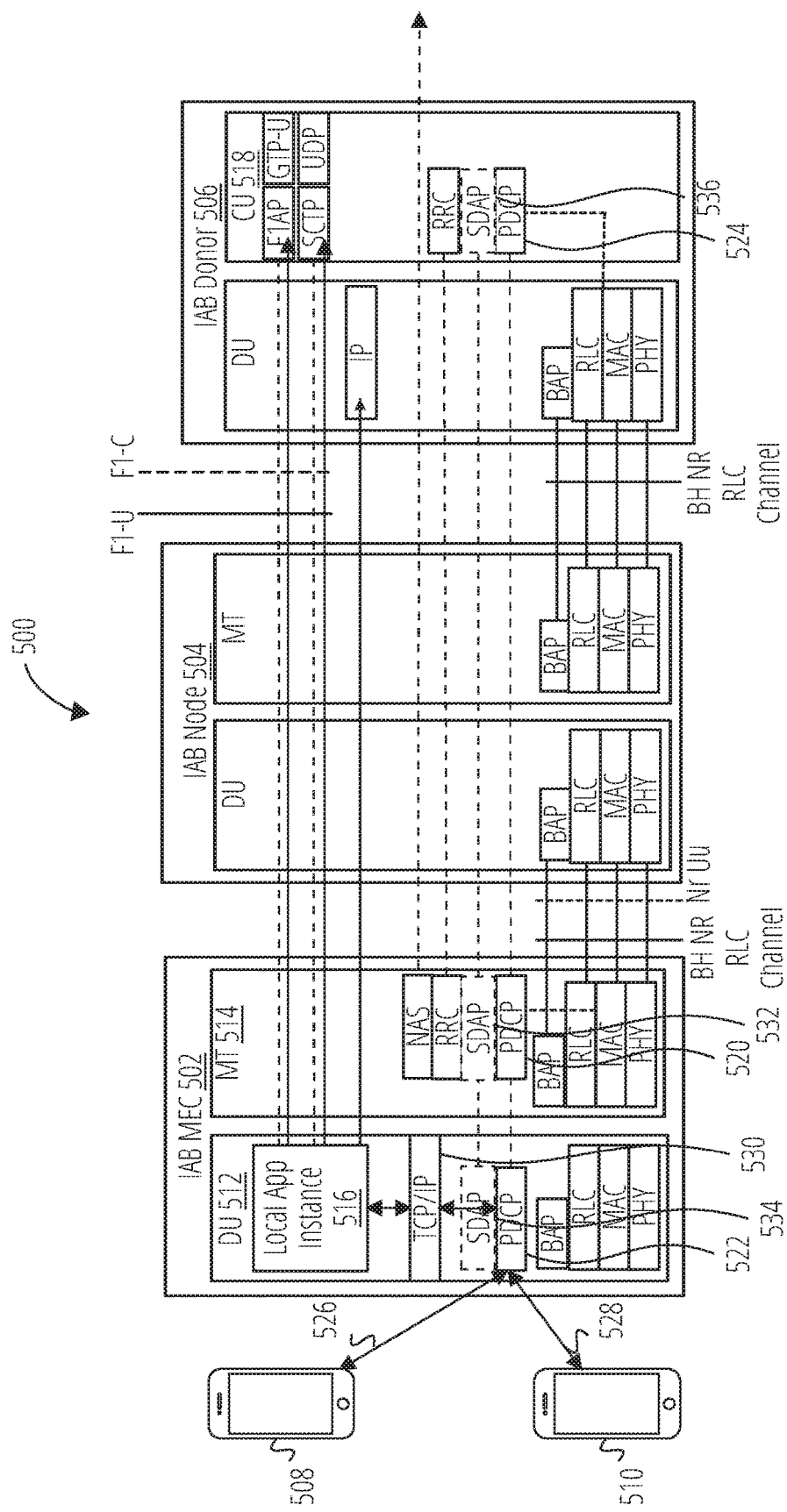
FIG. 5 illustrates an IAB network, according to an embodiment.

FIG. 5 illustrates an IAB network 500, according to an embodiment. The IAB network 500 includes an IAB MEC 502, an IAB node 504, an IAB donor 506, a first UE 508, and a second UE 510. In the example of FIG. 5, the IAB MEC 502 acts as both a UE and an access node (AN). In some embodiments, the IAB MEC 502 may be an enhanced residential gateway (eRG).

The IAB MEC 502 includes the DU 512 and the MT 514. As illustrated, a first PDCP layer 520 has been instantiated at the MT 514 of the IAB MEC 502. This first PDCP layer 520 may enable/allow for communication by the IAB MEC 502 at the PDCP layer level toward the IAB donor 506, and may act to terminate (e.g., provide an endpoint for) the PDCP for the overall IAB network 500 at the IAB MEC 502.

Further, the first UE 508 connects to the DU 512 of the IAB MEC 502 via the first access link 526 and the second UE 510 connects to the DU 512 of the IAB MEC 502 via the second access link 528. As shown, these connections are at the level of a second PDCP layer 522 that has been instantiated at the DU 512 of the IAB MEC 502. The DU 512 of the IAB MEC 502 may include a local application instance 516, which may be an instance of an application on the IAB MEC 502 according to a MEC functionality, as described above. Herein, applications that can generate such local application instances may be referred to as "MEC-enabled applications".

The second PDCP layer 522 in the DU 512 of the IAB MEC 502 may be used to transmit data to and from either of the first UE 508 and/or the second UE 510 through the IAB network 500. In this manner, a PDCP hopping mechanism through the IAB network 500 may be established (e.g., via the second PDCP layer 522, the first PDCP layer 520, and onward to a third PDCP layer 524 of the IAB donor 506). Such a hopping mechanism that uses the first PDCP layer 520 and the second PDCP layer 522 through the IAB MEC 502 to transport data may also be referred to herein as a level three (L3) relay. In such circumstances, it may be understood that data hopping through the IAB network 500 can occur at a higher level through the protocol stack of the IAB MEC 502 than, e.g., in the case of the second IAB node 204 or first IAB node 208 of FIG. 2, where hopping occurs at the PHY/MAC/RLC/BAP level only (which may be referred to herein as a level two (L2) hopping mechanism).

In the case of FIG. 5, the use of the second PDCP layer 522 may complete the protocol stack of the DU 512 of the IAB MEC 502 such that a functional route through the DU 512 of the IAB MEC 502 is completed between the first UE 508 and/or the second UE 510 and the local application instance 516 (e.g., transport of data between the UE and the local application instance 516 may be accomplished within the IAB MEC 502, without the IAB MEC 502 sending such data though other parent nodes(s) of the IAB network 500). For example, because, as illustrated, the first UE 508 and/or the second UE 510 are connected to the DU 512 at the level of the second PDCP layer 522, PDCP protocol data units (PDU) from theses UE are discernable at the IAB MEC 502 (from which transmission control protocol/internet protocol (TCP/IP) PDU are discernable by a TCP/IP layer 530 of the DU 512). Accordingly, the data from these UE can be routed from the second PDCP layer 522 to the TCP/IP layer 530 and from there passed up to the local application instance 516 present on the DU 512 of the IAB MEC 502. In the reverse direction, the second PDCP layer 522 may route data from the local application instance 516 as presented by the TCP/IP layer 530 as TCP/IP PDUs to the second PDCP layer 522, which can then route PDCP PDU taken from the TCP/IP PDUs to the appropriate one of the first UE 508 and the second UE 510 (again, without first sending such data through other parent nodes(s) of the IAB network 500). As described herein, data sent by, or data sent to, a local application instance (such as the local application instance 516) may be referred to as "data of the local application instance."

Accordingly, through the termination of the PDCP for the overall IAB network 500 at the IAB MEC 502 as described (e.g., according to the first PDCP layer 520 and/or second PDCP layer 522 at the IAB MEC 502), the UE may establish a PDU session for transporting data to the local application instance 516 of the IAB MEC 502 that is separate from a PDU session for transporting through the IAB network 500 to the CN or beyond.

Further, it is contemplated that bearer requests from UE (e.g., the first UE 508 and the second UE 510) can be aggregated based on grant requests at the IAB MEC 502 (and on the availability of application instances on the IAB MEC 502). In some instances, a bearer of the first UE 508 is aggregated with a bearer of a second UE within a PDCP channel between first PDCP layer 520 and the third PDCP layer 524 of the IAB donor 506. In this manner, a dual PDCP hopping arrangement may be created. For example, in FIG. 5, there may be a first PDCP hop between one (or both) of the first UE 508 and the second UE 510 and the IAB MEC 502, and a second PDCP hop between the IAB MEC 502 and the IAB donor 506.

Further, through the termination of the PDCP for the overall IAB network 500 at the IAB MEC 502 as described (e.g., according to at least the first PDCP layer 520 at the IAB MEC 502), updated content for the local application instance 516 may be provided to the IAB node 504 from the third PDCP layer 524 (on the CU 518 of the IAB donor 506) through the first PDCP layer 520 (on the MT 514) and on to the second PDCP layer 522 (on the DU 512). From the second PDCP layer 522, this data may be provided to the TCP/IP layer 530 and on up to the local application instance 516.

In some instances, the described PDCP-layer handling (e.g., including any PDCP hopping as described) may be used for specific services, such as, for example, for ultra-reliable low-latency communication (URLLC) data. In such cases, the IAB MEC 502 may act as a dual relay (L3 relay) for specific application instances using that data (so that, e.g., the URLLC data can be transported between the local application instance 516 and the first UE 508 or the second UE 510 without using parent node(s) of the IAB MEC 502) and may instead treat other data at an L2 relay level (e.g., by passing that data over to a CN through the IAB network 500 using BAP). In such cases, a PDU session for the URLLC data may be established by the first PDCP layer 520 of the MT 514, and data of the local application instance 516 may be updated accordingly. It is further contemplated that other services (other than URLLC data services) may be similarly treated.

In some embodiments of FIG. 5, the of the IAB MEC 502 may include a first service data adaptation protocol (SDAP) layer 532 in the DU 512 and a second SDAP layer 534 in the MT 514. These may operate in conjunction with a third SDAP layer 536 of the CU 518 of the IAB donor 506. The presence (or absence) of the first SDAP layer 532 and the second SDAP layer 534 may allow for different operations of the IAB MEC 502.

For example, in embodiments where there is no first SDAP layer 532 of second SDAP layer 534 in the IAB MEC 502, there may be a one-to-one correspondence between DRBs between a UE and the IAB MEC 502 and data for the local application instance 516 (e.g., data of a quality of service (QoS) flow corresponding to the local application instance 516 may be uniquely present on an assigned/associated DRB). In such a case, the second PDCP layer 522 may route the data to the local application instance 516 by routing the associated DRB(s) to the local application instance 516.

In other embodiments where there is a first SDAP layer 532 and a second SDAP layer 534 in the IAB MEC 502, one or more of the QoS flow(s) for data for the local application instance 516 could be mapped to a same DRB by/through the second SDAP layer 534.

In other embodiments where there is and first SDAP layer 532 and a second SDAP layer 534 in the IAB MEC 502, there may be no restriction on the mapping of any QoS flows associated to the data of the local application instance 516 to a specific DRB. In such cases, the second SDAP layer 534 may route PDCP PDUs belonging to QoS flow(s) for data for the local application instance 516 to the local application instance 516, and further re-route PDCP PDUs belonging to non-relevant (not for local application instance 516) QoS flow(s) to an upstream IAB donor 506 for receipt at a CN. In such cases, the PDCP layer for a same DRB is instantiated both locally at the UE and at the IAB MEC 502. There may control plane signaling between these instances along an E1' interface to provide coherence between the protocol layers of the UE and the IAB MEC 502.

Figure 6:
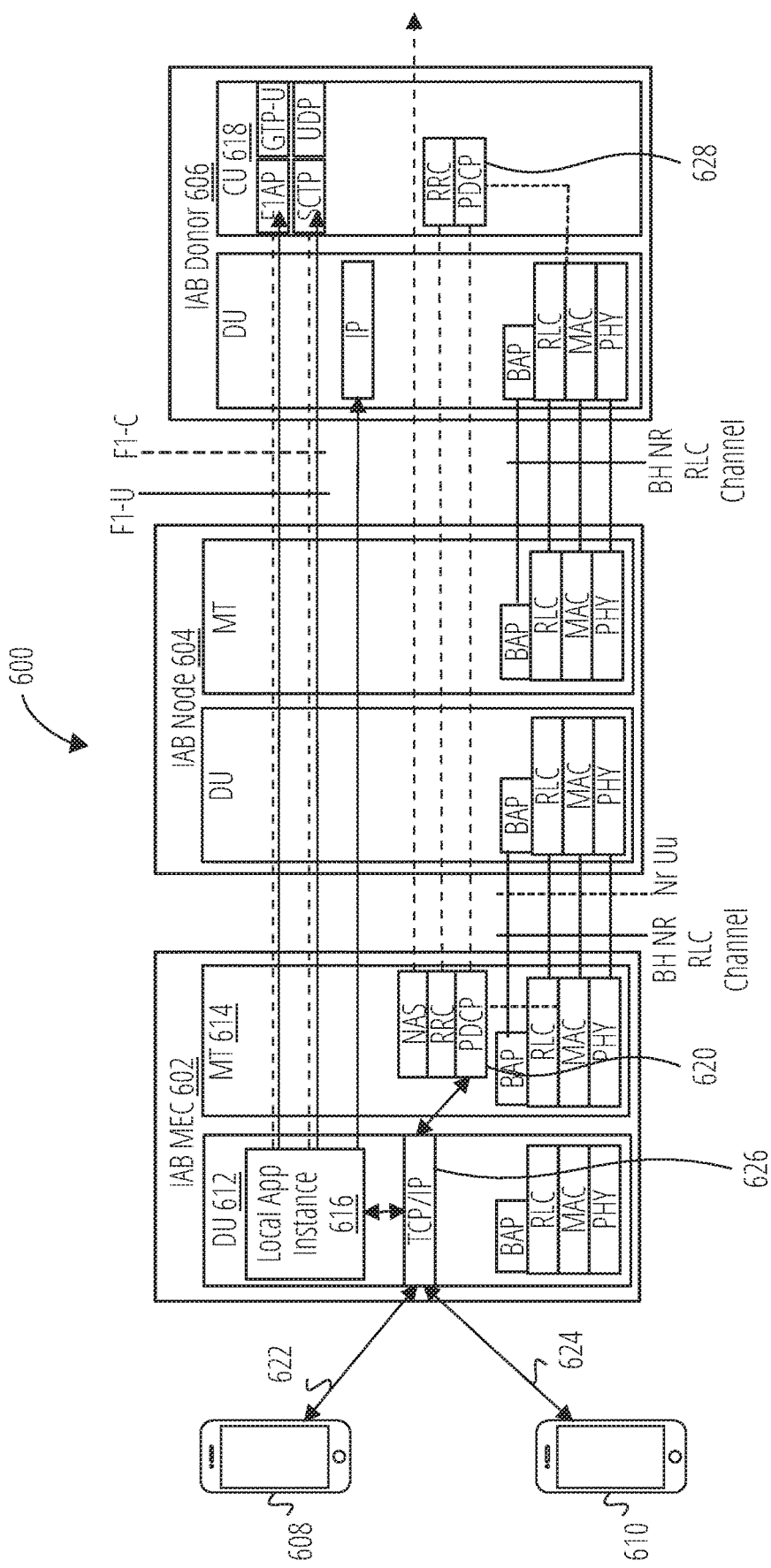
FIG. 6 illustrates an IAB network, according to an embodiment.

FIG. 6 illustrates an IAB network 600, according to an embodiment. The IAB network 600 includes an IAB MEC 602, an IAB node 604, an IAB donor 606, a first UE 608, and a second UE 610. In the example of FIG. 6, the IAB MEC 602 acts as both a UE and an AN. In some embodiments, the IAB MEC 602 may be an eRG.

The IAB MEC 602 includes the DU 612 and the MT 614. As illustrated, a first PDCP layer 620 has been instantiated at the MT 614 of the IAB MEC 602. This PDCP layer may enable/allow for communication by the IAB MEC 602 at the PDCP layer level toward the IAB donor 606, and may act to terminate (e.g., provide an endpoint for) the PDCP layer at the IAB MEC 602.

Further, the first UE 608 connects to the DU 612 of the IAB MEC 602 via the first access link 622 and the second UE 610 connects to the DU 612 of the IAB MEC 602 via the second access link 624. Differently from the IAB MEC 502 of FIG. 5, the IAB MEC 602 of FIG. 6 has been illustrated without any second PDCP layer instantiated in the DU 612. Accordingly, as shown, the first access link 622 for the first UE 608 and the second access link 624 for the second UE 610 connections are at the level of a TCP/IP layer 626 that has been instantiated at the DU 612 of the IAB MEC 602. The DU 612 of the IAB MEC 602 may include a local application instance 616, which may be an instance of a MEC-enabled application.

In the illustrated configuration of the IAB network 600 of FIG. 6, the first UE 608 and the second UE 610 may communicate with the local application instance 616 through local IP access mechanisms (with data of the local application instance 616 sent to and/or received from the TCP/IP layer 626 by the first UE 608 and/or the second UE 610). Because, as illustrated, the first UE 608 and/or the second UE 610 are connected to the DU 612 at the level of the TCP/IP layer 626, data from the first UE 608 and/or the second UE 610 can be passed up to the local application instance 616 present on the DU 612 of the IAB MEC 602 without first sending such data through other parent node(s) of the IAB network 600. In the reverse direction, the TCP/IP layer 626 may send data from the local application instance 616 to the appropriate one of the first UE 608 and the second UE 610 (again, without first sending such data through other parent node(s) of the IAB network 600). It is noted that bearer management in these contexts may be more complicated than in the case of the IAB network 500 of FIG. 5 (e.g., where this bearer management may imply a use of certain PDCP functionalit(ies) on the IAB MEC 602 that would be duplicative of analogous PDCP functionalit(ies) found on the CU 618, leading to decentralization of control away from the CU 618).

In cases, such as FIG. 6, where there is no PDCP layer at the DU 612 that functions as in the first PDCP layer 520 of the DU 512 of FIG. 5, it may be that communication between the TCP/IP layer 626 and the first PDCP layer 620 at the MT 514 occur according to grants allocated by the IAB donor 606.

Because of the termination of the PDCP for the overall IAB network 600 at the IAB MEC 602 (e.g., according to the first PDCP layer 620), and the UE may accordingly establish a PDU session for transporting data to the local application instance 616 of the IAB MEC 602 (leveraging the described communications through the TCP/IP layer 626) that is separate from a PDU session for transporting through the IAB network 600 to the CN or beyond.

Further, through the termination of the PDCP for the overall IAB network 600 at the IAB MEC 602 as described (e.g., according to the first PDCP layer 520), updated content for the local application instance 616 may be provided to the IAB node 604 from the second PDCP layer 628 (on the CU 618 of the IAB donor 606) through the first PDCP layer 620 (on the MT 614) and on to the TCP/IP layer 626 (on the DU 612). From the TCP/IP layer 626, this data may be provided on up to the local application instance 516.

Finally, for data not sent using such IP access mechanisms, the IAB MEC 602 may continue to act as an RLC relay (L2 relay) with the PDCP layer for the L2 relay instead terminated on the relevant UE, ensuring R16/R17 bearer management, as appropriate. For example, the IAB network 600 may be configured to route data for special services (e.g., certain QoS flows) between the first UE 608 or the second UE 610 and the local application instance 616 via the TCP/IP layer 626 as described, while other data (e.g., to be sent to a CN) may be sent according to an L2 relay. In some instances, such routing via the TCP/IP layer 626 may be performed for URLLC data, while non-URLLC data is sent according to an L2 relay.

Figure 7:
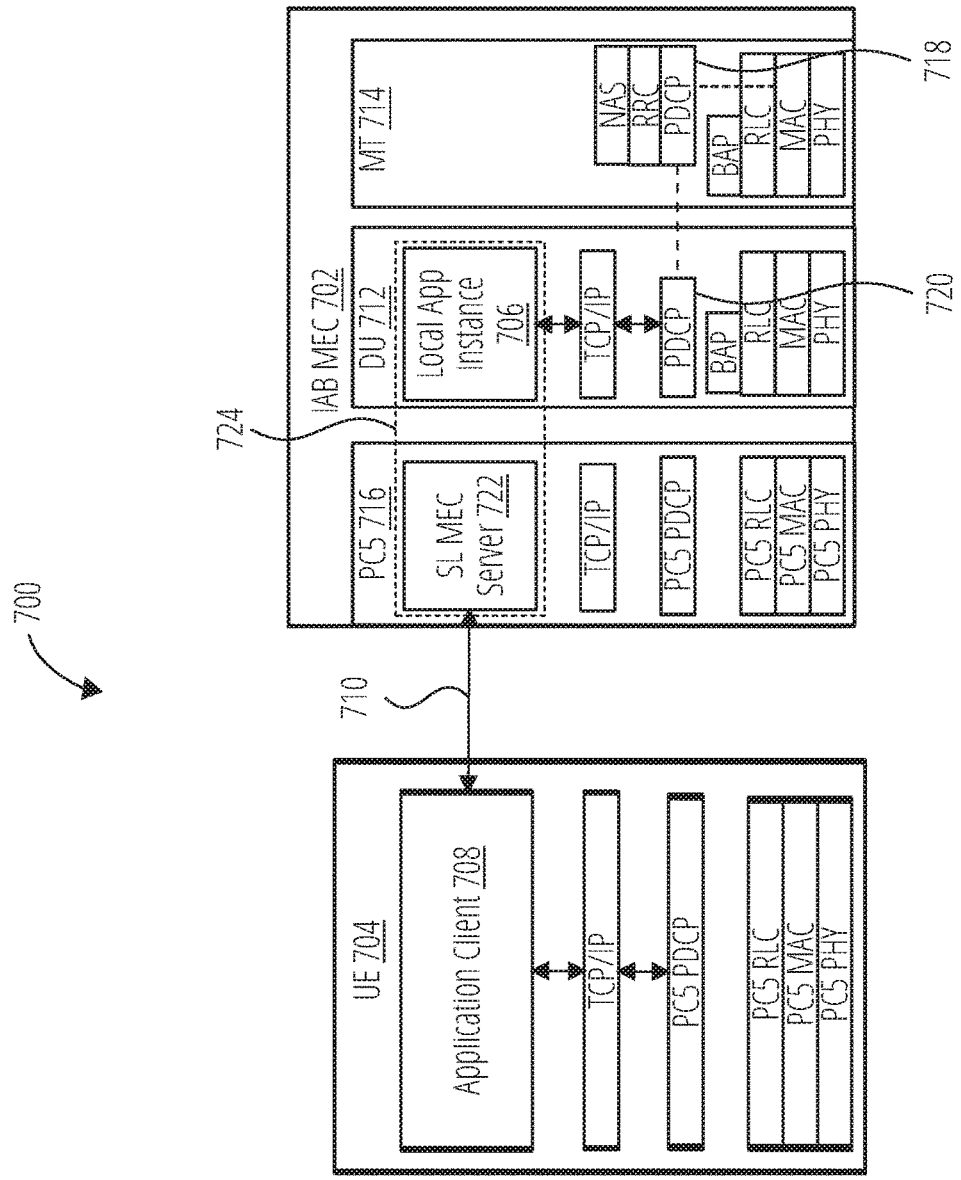
FIG. 7 illustrates a system for communicating between a local application instance on an IAB MEC and an application client on a UE using an access link according to sidelink (SL) aspects, according to an embodiment.

FIG. 7 illustrates a system 700 for communicating between a local application instance 706 on an IAB MEC 702 and an application client 708 on a UE 704 using an access link 710 according to sidelink (SL) aspects, according to an embodiment. As illustrated, the IAB MEC 702 includes an MT 714 having a first PDCP layer 718 and a DU 712 having a second PDCP layer 720 (e.g., similar to the IAB MEC 502 described in FIG. 5, but note that the use of an IAB MEC along the lines of the IAB MEC 602 of FIG. 6, which would lack the second PDCP layer 720, or some other IAB MEC, is also contemplated). In FIG. 7, as illustrated, the IAB MEC 702 further includes the PC5 functionality 716, through which the IAB MEC 702 may operate using SL communications with an SL MEC server 722, which may be understood to be functionally hosting 724 the local application instance 706 on the DU 712. In some embodiments, the IAB MEC 702 may be an eRG.

Each of the UE 704 and the IAB MEC 702 may comprise a full PC5 protocol stack (as illustrated), allowing the application client 708 to logically interface with the SL MEC server 722 in order to facilitate the transport of data between the local application instance 706 and the application client 708 on the UE 704 via SL. The PC5 functionality 716 of the IAB MEC 702 accordingly communicates the data to/from the DU 712 of the IAB MEC 702 corresponding to this data path (and the DU 712 may then transport data to/from the local application instance 706 without that data passing through any upstream parent node(s) of the IAB MEC 702 of an IAB network (not illustrated)). Further, other data from the UE 704 may be passed by the DU 712 on through to the MT 714 of the IAB MEC 702 for communication to a CN or beyond (e.g., according to an L2 relay schema).

Using SL methods as described may avoid a need to particularly configure the UE 704 for local application instance-specific PDCP communications with a PDCP layer of the DU 712 of the IAB MEC 702 (and may further not implicate security aspects that may occur as a result of that action). It is therefore contemplated that such benefits may be achieved by the use of the PC5 functionality 716 of the IAB MEC 702 with UE that support SL/have been configured with a PC5 protocol stack, as in the UE 704.

Figure 8:
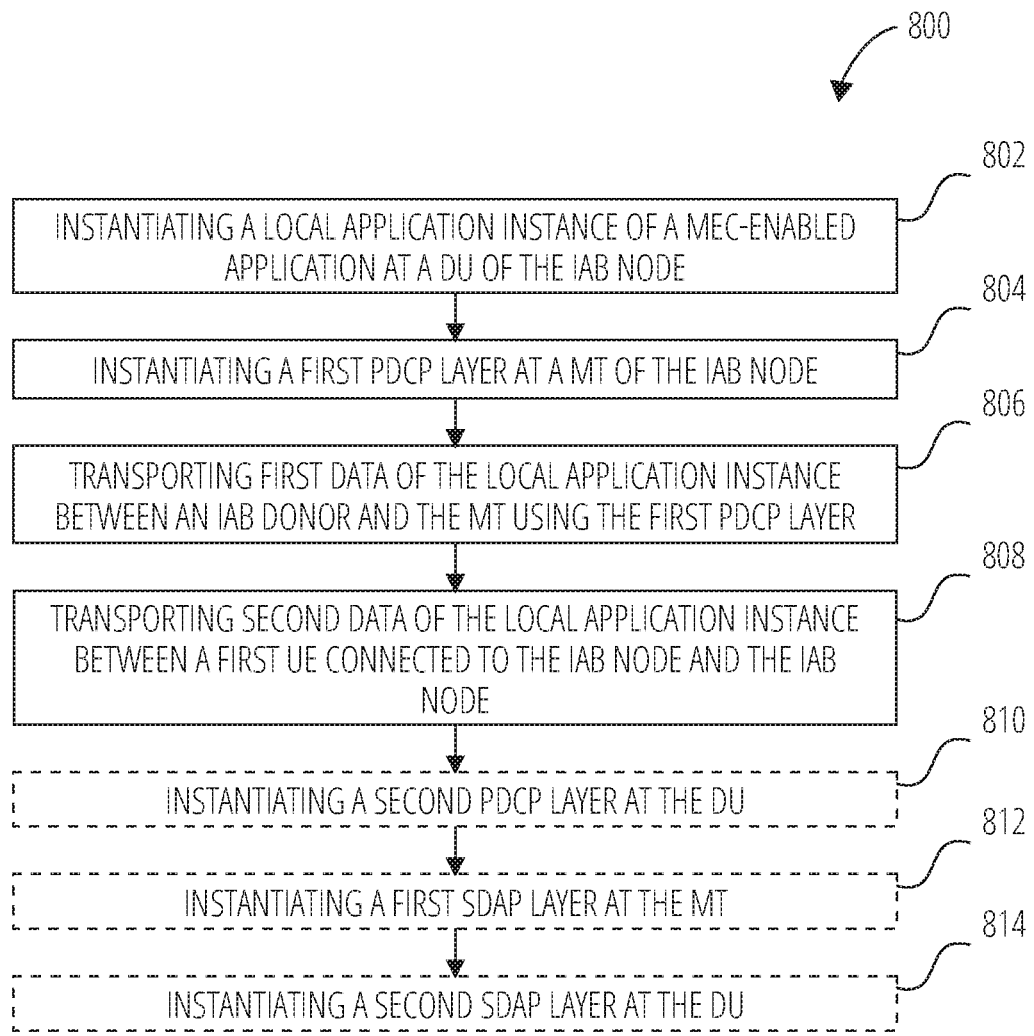
FIG. 8 illustrates a method of an IAB node, according to an embodiment.

FIG. 8 illustrates a method 800 of an IAB node, according to an embodiment. The method 800 includes instantiating 802 a local application instance of a MEC-enabled application at a DU of the IAB node.

The method 800 further includes instantiating 804, a first PDCP layer at an MT of the IAB node.

The method 800 further includes transporting 806 first data of the local application instance between an IAB donor and the MT using the first PDCP layer.

The method 800 further includes transporting 808 second data of the local application instance between a first UE connected to the IAB node and the IAB node.

The method 800 further optionally includes instantiating 810 a second PDCP layer at the DU. In these cases, it may be that the second data is transported between the DU and the first UE using the second PDCP layer. In some of these cases, the method 800 may further include transporting the first data between the DU and the MT using the first PDCP layer and the second PDCP layer.

The method 800 further optionally includes instantiating 812 a first SDAP layer at the MT. In these cases, it may be that the first data is transported between the MT and the IAB donor via the first SDAP layer.

The method 800 further optionally includes instantiating 814 a second SDAP layer at the DU. In these cases, it may be that the second data is transported between the DU and the first UE via the second SDAP layer.

In some embodiments of the method 800, the first data comprises updated content for the local application instance.

In some embodiments of the method 800, the IAB node comprises an eRG.

Some embodiments of the method 800 further include aggregating a bearer of the first UE with a bearer of a second UE connected to the IAB node within a PDCP channel between the first PDCP layer and a second PDCP layer of the IAB donor.

In some embodiments of the method 800, the second data comprises URLLC data. In some of these embodiments, the method 800 further includes transporting third data between the IAB donor and the first UE according to a n L2 relay functionality.

Some embodiments of the method 800 further include transporting the first data between the DU and the MT using a TCP/IP layer of the DU that interfaces with the first PDCP layer. In some of these embodiments, the second data is transported to the first UE using the TCP/IP layer.

Some embodiments of the method 800 further include instantiating a sidelink protocol stack at the IAB node, wherein the second data is transported between the IAB node and the first UE using the sidelink protocol stack.

Embodiments contemplated herein include an apparatus comprising means to perform one or more elements of the method 800. This apparatus may be, for example, an apparatus of a IAB node (such as a network device 1016 that is an IAB node, as described herein).

Embodiments contemplated herein include one or more non-transitory computer-readable media comprising instructions to cause an electronic device, upon execution of the instructions by one or more processors of the electronic device, to perform one or more elements of the method 800. This non-transitory computer-readable media may be, for example, a memory of an IAB node (such as a memory 1020 of a network device 1016 that is an IAB node, as described herein).

Embodiments contemplated herein include an apparatus comprising logic, modules, or circuitry to perform one or more elements of the method 800. This apparatus may be, for example, an apparatus of an IAB node (such as a network device 1016 that is an IAB node, as described herein).

Embodiments contemplated herein include an apparatus comprising: one or more processors and one or more computer-readable media comprising instructions that, when executed by the one or more processors, cause the one or more processors to perform one or more elements of the method 800. This apparatus may be, for example, an apparatus of an IAB node (such as a network device 1016 that is an IAB node, as described herein).

Embodiments contemplated herein include a signal as described in or related to one or more elements of the method 800.

Embodiments contemplated herein include a computer program or computer program product comprising instructions, wherein execution of the program by a processing element is to cause the processing element to carry out one or more elements of the method 800. The processor may be a processor of an IAB node (such as a processor(s) 1004 of a network device 1016 that is an IAB node, as described herein). These instructions may be, for example, located in the processor and/or on a memory of the IAB node (such as a memory 1006 of a network device 1016 that is an IAB node, as described herein).

Figure 9:
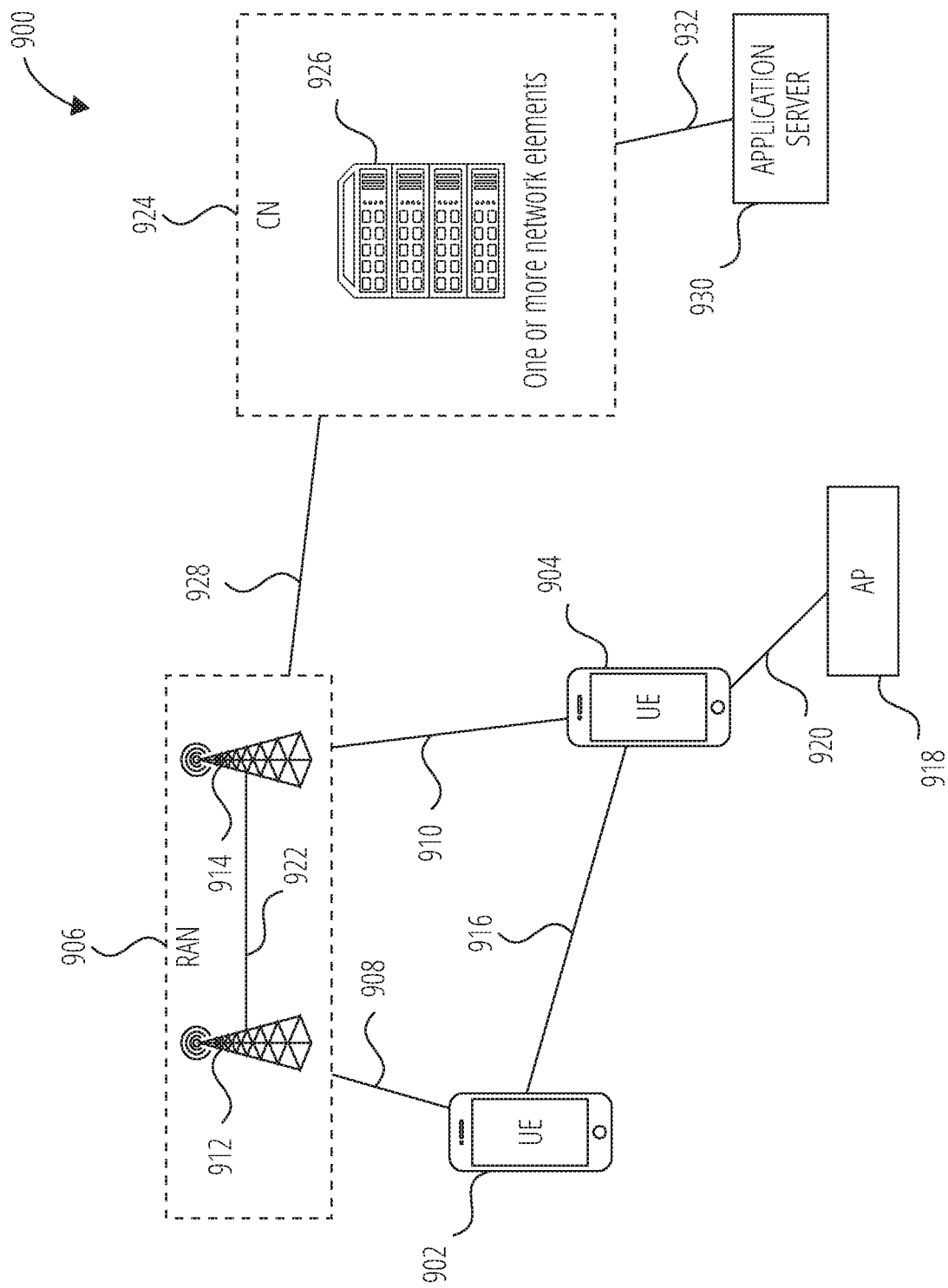
FIG. 9 illustrates an example architecture of a wireless communication system, according to embodiments disclosed herein.

FIG. 9 illustrates an example architecture of a wireless communication system 900, according to embodiments disclosed herein. The following description is provided for an example wireless communication system 900 that operates in conjunction with the LTE system standards and/or 5G or NR system standards as provided by 3GPP technical specifications.

As shown by FIG. 9, the wireless communication system 900 includes UE 902 and UE 904 (although any number of UEs may be used). In this example, the UE 902 and the UE 904 are illustrated as smartphones (e.g., handheld touchscreen mobile computing devices connectable to one or more cellular networks), but may also comprise any mobile or non-mobile computing device configured for wireless communication.

The UE 902 and UE 904 may be configured to communicatively couple with a RAN 906. In embodiments, the RAN 906 may be NG-RAN, E-UTRAN, etc. The UE 902 and UE 904 utilize connections (or channels) (shown as connection 908 and connection 910, respectively) with the RAN 906, each of which comprises a physical communications interface. The RAN 906 can include one or more nodes, such as base station 912 and/or the IAB node 914, that enable the connection 908 and connection 910.

In this example, the connection 908 and connection 910 are air interfaces to enable such communicative coupling, and may be consistent with RAT(s) used by the RAN 906, such as, for example, an LTE and/or NR.

In some embodiments, the UE 902 and UE 904 may also directly exchange communication data via a sidelink interface 916. The UE 904 is shown to be configured to access an access point (shown as AP 918) via connection 920. By way of example, the connection 920 can comprise a local wireless connection, such as a connection consistent with any IEEE 1002.11 protocol, wherein the AP 918 may comprise a Wi-Fi® router. In this example, the AP 918 may be connected to another network (for example, the Internet) without going through a CN 924.

In embodiments, the UE 902 and UE 904 can be configured to communicate using orthogonal frequency division multiplexing (OFDM) communication signals with each other or with the base station 912 and/or the IAB node 914 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the base station 912 or IAB node 914 may be implemented as one or more software entities running on server computers as part of a virtual network. In addition, or in other embodiments, the base station 912 or IAB node 914 may be configured to communicate with one another via interface 922. In embodiments where the wireless communication system 900 is an LTE system (e.g., when the CN 924 is an EPC), the interface 922 may be an X2 interface. The X2 interface may be defined between two or more base stations (e.g., two or more eNBs and the like) that connect to an EPC, and/or between two eNBs connecting to the EPC. In embodiments where the wireless communication system 900 is an NR system (e.g., when CN 924 is a 5GC), the interface 922 may be an Xn interface. The Xn interface is defined between two or more base stations (e.g., two or more gNBs and the like) that connect to 5GC, between a base station 912 (e.g., a gNB) connecting to 5GC and an eNB, and/or between two eNBs connecting to 5GC (e.g., CN 924).

The RAN 906 is shown to be communicatively coupled to the CN 924. The CN 924 may comprise one or more network elements 926, which are configured to offer various data and telecommunications services to customers/subscribers (e.g., users of UE 902 and UE 904) who are connected to the CN 924 via the RAN 906. The components of the CN 924 may be implemented in one physical device or separate physical devices including components to read and execute instructions from a machine-readable or computer-readable medium (e.g., a non-transitory machine-readable storage medium).

In embodiments, the CN 924 may be an EPC, and the RAN 906 may be connected with the CN 924 via an S1 interface 928. In embodiments, the S1 interface 928 may be split into two parts, an S1 user plane (S1-U) interface, which carries traffic data between the base station 912 or IAB node 914 and a serving gateway (S-GW), and the S1-MME interface, which is a signaling interface between the base station 912 or IAB node 914 and mobility management entities (MMEs).

In embodiments, the CN 924 may be a 5GC, and the RAN 906 may be connected with the CN 924 via an NG interface 928. In embodiments, the NG interface 928 may be split into two parts, an NG user plane (NG-U) interface, which carries traffic data between the base station 912 or IAB node 914 and a user plane function (UPF), and the S1 control plane (NG-C) interface, which is a signaling interface between the base station 912 or IAB node 914 and access and mobility management functions (AMFs).

Generally, an application server 930 may be an element offering applications that use internet protocol (IP) bearer resources with the CN 924 (e.g., packet switched data services). The application server 930 can also be configured to support one or more communication services (e.g., VoIP sessions, group communication sessions, etc.) for the UE 902 and UE 904 via the CN 924. The application server 930 may communicate with the CN 924 through an IP communications interface 932.

Figure 10:
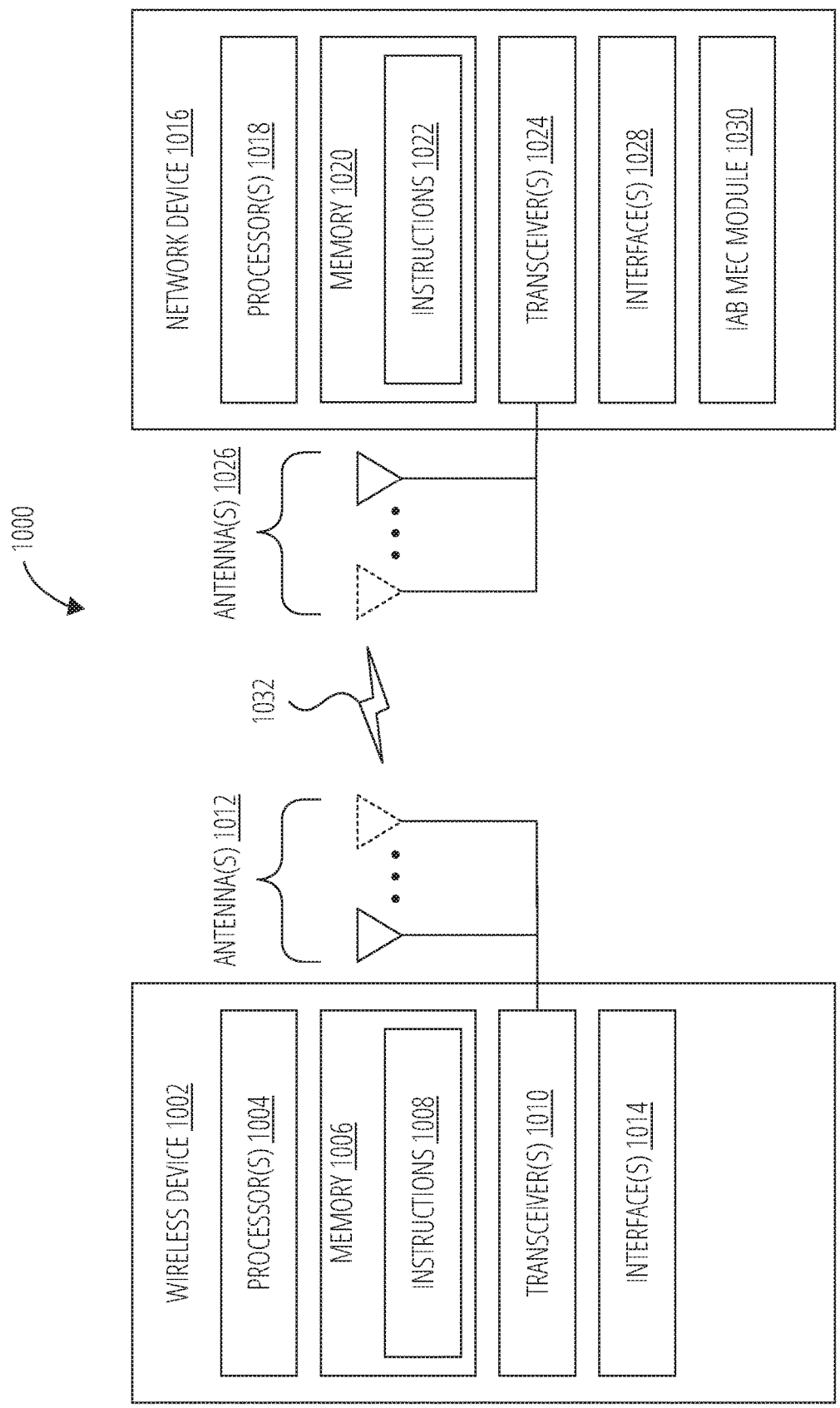
FIG. 10 illustrates a system for performing signaling between a wireless device and a network device, according to embodiments disclosed herein.

FIG. 10 illustrates a system 1000 for performing signaling 1032 between a wireless device 1002 and a network device 1016, according to embodiments disclosed herein. The system 1000 may be a portion of a wireless communications system as herein described. The wireless device 1002 may be, for example, a UE of a wireless communication system. The network device 1016 may be, for example, an IAB node of a wireless communication system.

The wireless device 1002 may include one or more processor(s) 1004. The processor(s) 1004 may execute instructions such that various operations of the wireless device 1002 are performed, as described herein. The processor(s) 1004 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 1002 may include a memory 1006. The memory 1006 may be a non-transitory computer-readable storage medium that stores instructions 1008 (which may include, for example, the instructions being executed by the processor(s) 1004). The instructions 1008 may also be referred to as program code or a computer program. The memory 1006 may also store data used by, and results computed by, the processor(s) 1004.

The wireless device 1002 may include one or more transceiver(s) 1010 that may include radio frequency (RF) transmitter and/or receiver circuitry that use the antenna(s) 1012 of the wireless device 1002 to facilitate signaling (e.g., the signaling 1032) to and/or from the wireless device 1002 with other devices (e.g., the network device 1016) according to corresponding RATs.

The wireless device 1002 may include one or more antenna(s) 1012 (e.g., one, two, four, or more). For embodiments with multiple antenna(s) 1012, the wireless device 1002 may leverage the spatial diversity of such multiple antenna(s) 1012 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the wireless device 1002 may be accomplished according to precoding (or digital beamforming) that is applied at the wireless device 1002 that multiplexes the data streams across the antenna(s) 1012 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the wireless device 1002 may implement analog beamforming techniques, whereby phases of the signals sent by the antenna(s) 1012 are relatively adjusted such that the (joint) transmission of the antenna(s) 1012 can be directed (this is sometimes referred to as beam steering).

The wireless device 1002 may include one or more interface(s) 1014. The interface(s) 1014 may be used to provide input to or output from the wireless device 1002. For example, a wireless device 1002 that is a UE may include interface(s) 1014 such as microphones, speakers, a touchscreen, buttons, and the like in order to allow for input and/or output to the UE by a user of the UE. Other interfaces of such a UE may be made up of transmitters, receivers, and other circuitry (e.g., other than the transceiver(s) 1010/antenna(s) 1012 already described) that allow for communication between the UE and other devices and may operate according to known protocols (e.g., Wi-Fi®, Bluetooth®, and the like).

The network device 1016 may include one or more processor(s) 1018. The processor(s) 1018 may execute instructions such that various operations of the network device 1016 are performed, as described herein. The processor(s) 1004 may include one or more baseband processors implemented using, for example, a CPU, a DSP, an ASIC, a controller, an FPGA device, another hardware device, a firmware device, or any combination thereof configured to perform the operations described herein.

The network device 1016 may include a memory 1020. The memory 1020 may be a non-transitory computer-readable storage medium that stores instructions 1022 (which may include, for example, the instructions being executed by the processor(s) 1018). The instructions 1022 may also be referred to as program code or a computer program. The memory 1020 may also store data used by, and results computed by, the processor(s) 1018.

The network device 1016 may include one or more transceiver(s) 1024 that may include RF transmitter and/or receiver circuitry that use the antenna(s) 1026 of the network device 1016 to facilitate signaling (e.g., the signaling 1032) to and/or from the network device 1016 with other devices (e.g., the wireless device 1002) according to corresponding RATs.

The network device 1016 may include one or more antenna(s) 1026 (e.g., one, two, four, or more). In embodiments having multiple antenna(s) 1026, the network device 1016 may perform MIMO, digital beamforming, analog beamforming, beam steering, etc., as has been described.

The network device 1016 may include one or more interface(s) 1028. The interface(s) 1028 may be used to provide input to or output from the network device 1016. For example, a network device 1016 that is a base station may include interface(s) 1028 made up of transmitters, receivers, and other circuitry (e.g., other than the transceiver(s) 1024/antenna(s) 1026 already described) that enables the base station to communicate with other equipment in a core network, and/or that enables the base station to communicate with external networks, computers, databases, and the like for purposes of operations, administration, and maintenance of the base station or other equipment operably connected thereto.

The network device 1016 may include an IAB MEC module 1030. The IAB MEC module 1030 may be implemented via hardware, software, or combinations thereof. For example, the IAB MEC module 1030 may be implemented as a processor, circuit, and/or instructions 1022 stored in the memory 1020 and executed by the processor(s) 1018. In some examples, the IAB MEC module 1030 may be integrated within the processor(s) 1018 and/or the transceiver(s) 1024. For example, the IAB MEC module 1030 may be implemented by a combination of software components (e.g., executed by a DSP or a general processor) and hardware components (e.g., logic gates and circuitry) within the processor(s) 1018 or the transceiver(s) 1024.

The IAB MEC module 1030 may be used for various aspects of the present disclosure, for example, aspects of FIG. 5 through FIG. 8. For example, for a network device 1016 that is an IAB node for MEC (an IAB MEC), the IAB MEC module 1030 may be configured to facilitate the transport of data of a local application instance of the IAB MEC to one or more UE connected to the IAB MEC without sending that data to or through an upstream parent node of an IAB network of the IAB MEC. To facilitate this behavior, the IAB MEC module 1030 may be configured to instantiate and use TCP/IP layer(s), PDCP layer(s), SDAP layer(s), and/or a PC5 protocol stack of the IAB MEC, in the manner described above.

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. An integrated access and backhaul (IAB) node configured for multi-access edge computing (MEC), comprising:
   a distributed unit (DU), comprising:
      a local application instance of an MEC-enabled application, the local application instance configured for communication with a first user equipment (UE) connected to the IAB node and an external instance of the MEC-enabled application residing beyond a core network for the IAB node; and
   a mobile termination functionality (MT), comprising:
      a first packet data convergence protocol (PDCP) layer configured to transport first data of the local application instance between the MT and an IAB donor.

2. The IAB node of claim 1, wherein the first data comprises updated content for the local application instance.

3. The IAB node of claim 1, wherein the IAB node comprises an evolved residential gateway (eRG).

4. The IAB node of claim 1, wherein the IAB node is configured to aggregate a bearer of the first UE with a bearer of a second UE connected to the IAB node within a PDCP channel between the first PDCP layer and a second PDCP layer of the IAB donor.

5. The IAB node of claim 1, wherein the DU further comprises:
a second PDCP layer configured to transport second data of the local application instance between the DU and the first UE.

6. The IAB node of claim 5, wherein the first PDCP layer and the second PDCP layer are configured to transport the first data between the DU and the MT.

7. The IAB node of claim 5, wherein:
the MT further comprises a first service data adaptation protocol (SDAP) layer configured to transport the first data between the MT and the IAB donor; and
the DU further comprises a second SDAP layer configured to transport the second data between the DU and the first UE.

8. The IAB node of claim 1, wherein:
the DU further comprises:
a transmission control protocol/internet protocol (TCP/IP) layer configured to interface with the first PDCP layer to transport the first data between the DU and the MT.

9. The IAB node of claim 8, wherein the TCP/IP layer is further configured to transport second data of the local application instance between the UE and the DU.

10. The IAB node of claim 9, wherein the second data comprises ultra-reliable low-latency communication (URLLC) data.

11. The IAB node of claim 10, wherein:
the IAB node is further configured to transport third data between the IAB donor and the first UE according to a layer 2 (L2) relay functionality.

12. The IAB node of claim 1, further comprising:
a sidelink protocol stack configured to transport second data of the local application instance between the UE and the IAB node.

13. A method of an integrated access and backhaul (IAB) node configured for multi-access edge computing (MEC), comprising:
instantiating a local application instance of a MEC-enabled application at a distributed unit (DU) of the IAB node, wherein the local application instance is configured to communicate with an external instance of the MEC-enabled application residing beyond a core network for the IAB node;
instantiating a first packet data convergence protocol (PDCP) layer at a mobile termination functionality (MT) of the IAB node;
transporting first data of the local application instance between an IAB donor and the MT using the first PDCP layer; and
transporting second data of the local application instance between a first user equipment (UE) connected to the IAB node and the IAB node.

14. The method of claim 13, wherein the first data comprises updated content for the local application instance.

15. The method of claim 13, wherein the IAB node comprises an evolved residential gateway (eRG).

16. The method of claim 13, further comprising:
aggregating a bearer of the first UE with a bearer of a second UE connected to the IAB node within a PDCP channel between the first PDCP layer and a second PDCP layer of the IAB donor.

17. The method of claim 13, wherein the second data comprises ultra-reliable low-latency communication (URLLC) data.

18. The method of claim 17, further comprising:
transporting third data between the IAB donor and the first UE according to a layer 2 (L2) relay functionality.

19. The method of claim 13, further comprising:
instantiating a second PDCP layer at the DU; wherein:
the second data is transported between the DU and the first UE using the second PDCP layer.

20. The method of claim 19, further comprising:
transporting the first data between the DU and the MT using the first PDCP layer and the second PDCP layer.

* * * * *